March 24, 1970  R. S. SCHOOLS ET AL  3,503,050
WAVE ENERGY RECORDING IN RADIATION SENSITIVE MEDIUM
Filed Dec. 30, 1965

INVENTORS
RODMAN S. SCHOOLS
GLENN T. SINCERBOX

ATTORNEYS

INVENTORS
RODMAN S. SCHOOLS
GLENN T. SINCERBOX

BY *Littlepage & Quaintance*

ATTORNEYS

United States Patent Office 3,503,050
Patented Mar. 24, 1970

3,503,050
WAVE ENERGY RECORDING IN RADIATION
SENSITIVE MEDIUM
Redman S. Schools, Poughkeepsie, and Glenn T. Sincerbox, Wappingers Falls, N.Y., assignors to International Business Machines Corporation, Armonk, N.Y., a corporation of New York
Filed Dec. 30, 1965, Ser. No. 517,571
Int. Cl. G11b 7/00; G03c 7/00
U.S. Cl. 340—173          12 Claims

ABSTRACT OF THE DISCLOSURE

Interfering waves of coherent light sensitize a layer of a photosensitive emulsion at antinodes of the standing waves throughout the thickness of the emulsion to form a periodic structure of reflecting surfaces. A plurality of such structures may be formed at any one point at different angles and are read out by the angle of reflected light. The interfering waves may be formed by an incident ray reflected back through the emulsion by a reflecting surface. Information may be recorded in successive regions by light beams at different angles in each region.

---

This invention relates to the recording of information by wave energy transmitted in a radiation sensitive medium, and reading said information by wave energy.

In the early days of photography, Gabrielle Lippmann, by a photographic process since known as the Lippmann process, recorded information in the colors of an image by the formation of standing waves of light in a transparent photosensitive emulsion. The antinodes or peaks of energy of the interfering light waves produced chemical changes in the photosensitive emulsion, so that particles of metallic silver were formed. The loci of the energy peaks of the standing waves of each color or wave length produced a formation of the reflecting particles of silver in equally spaced surfaces which constituted a periodic structure coincident with the antinodes of the interfering waves. The different series of surfaces formed by different colors were rendered visible by reflected light which included the original wave lengths, or different wavelengths if shrinkage occurs during chemical processing.

In the Lippmann process, the stationary waves were formed by reflecting the direct waves from a surface of mercury in direct contact with the emulsion. Attempts to replace the mercury with other reflecting surfaces were not very successful. The short trains of incoherent light waves could not be reflected in phase to form standing waves from any but the most perfect contact with the emulsion.

With the development of sources of coherent light, applicants have been able to establish stationary waves in a sensitive emulsion without the necessity for close contact of a reflecting surface with the emulsion. The long trains of coherent waves can be reflected from a surface spaced from the emulsion, or interfering waves can be formed by two trains of waves of the same wave length, in either case the interference between the waves setting up zones of maximum energy to activate the emulsion.

These stationary waves as heretofore used to record in an emulsion have been parallel to each other and perpendicular to the surface of the emulsion. The resultant periodic variations in the structure of the emulsion formed in this manner lie in parallel surfaces generally parallel to the surface of the emulsion.

The invention in the present case resides in recording by stationary waves in the emulsion in different directions, so that the surfaces coincident with the periodic variations in the structure resulting from a standing wave in one direction will be at an angle to the surfaces from standing waves in other directions. In this way, radiation of a single wave length may be used to record in the same region by changes in direction of the radiating wave energy. Recording by radiation in a plurality of directions in the same region simplifies the operation, especially when coherent light is used, as the same wave length light can be used for a number of recordings in the same region, and the several recordings can be made either simultaneously or successively.

This principle of establishing the periodic structures of surfaces at different angles in a recording medium is a general phenomenon, applicable to different forms of wave energy recording. The peak energy of the interfering electromagnetic waves may modify the recording medium at loci lying in equally spaced surfaces forming the periodic structures which are at angles to each other in the medium, increasing the information to be represented in the same region by the number of different directions in which the information is recorded.

The information is also read by the transmission of wave energy in the medium at an angle to each surface in each series of parallel surfaces, the periodic structure modifying the transmitted frequency to indicate the recorded information. When the recording is made by the action of light on a photosensitive emulsion, each set of parallel surfaces will reflect transmitted light of the proper wave length, so that the recorded information in a given region may be read either simultaneously or successively.

It is an object of this invention to record information in a recording medium by applying spaced peaks of energy in the recording medium, so that the energy peaks modify the transmission and reflecting properties of the medium, and form a periodic structure which may be sensed by wave energy.

It is a more specific object of this invention to record information in a recording medium by transmitting interfering waves of electromagnetic radiation through said medium in different directions to alter the transmission and reflecting properties of the medium at the loci of peak energy, the changes in the properties of the medium along each path of radiation forming a periodic structure in the medium.

It is a further object of this invention to record information in a photosensitive medium by establishing energy peaks by interfering waves of coherent radiation in different directions in said medium, to produce photochemical changes in said medium at the loci of the energy peaks. The loci of the changes in said medium lie in series of periodic structures which are normal to the paths in different directions. The information is to be read out by wave energy transmitted across said structures.

The foregoing and other objects, features and advantages of the present invention will be apparent from the following more particular description of the preferred embodiment of the invention as illustrated in the accompanying drawings.

In the specific embodiment selected to illustrate the principles of the invention, a silver halide emulsion, e.g., silver bromide, is used for the recording medium and a source of coherent light, a laser, is used as the emitter of the wave energy. Interference between the waves of radiation energy formed by reflection of the light back along the same path produces the peaks of energy to change the emulsion. While these specific elements and action have many advantages for certain applications, as when recording information in the form of bits in distinct regions or "cells," the same principles may be applied with other mediums and other types of radiant energy, and the interference may be derived from any relation between waves of radiation which produces peaks of energy.

Figure 1:
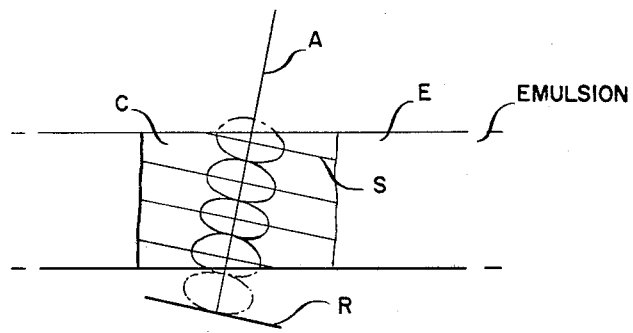
FIGURE 1 is a diagrammatic view showing the principle of operation basic to this invention.

As illustrated in FIGURE 1, standing waves are formed in an emulsion E in a single region or cell C by a train of waves of coherent light A passing through the emulsion and reflected waves returned along the same path by a reflector R. A node or point of zero energy is formed by the reflecting surface, and at every half wave length along the path. Between the nodes are the antinodes, where the energy level of the interfering waves is at a peak at every half wave length along the path. The peak energy level at the antinodes decomposes the silver halide to leave metallic silver, as in the usual photographic process. The silver particles will lie in surface S perpendicular to the path of the standing waves and form a periodic structure in the recording medium, which will reflect wave energy of the same half wave length, or slightly different to compensate for any shrinkage.

Figure 2:
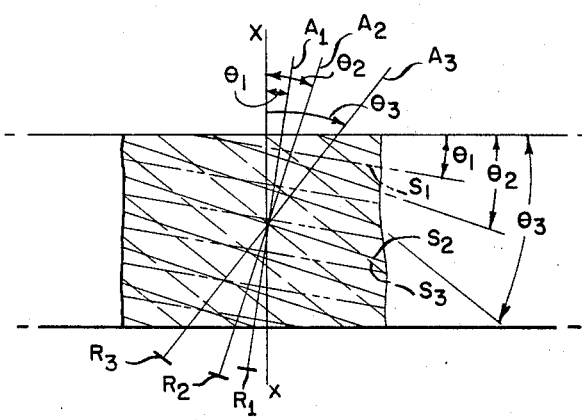
FIGURE 2 is another diagrammatic view showing the operation of this invention.

The principles of this invention are illustrated in FIGURE 2. Wave energy, such as coherent light, is transmitted along paths $A_1$, $A_2$, $A_3$ in different directions at angles $\theta_1$, $\theta_2$, $\theta_3$ to a line X—X and reflected back along the same paths by the reflectors $R_1$, $R_2$, $R_3$. The standing waves produced by interference of the waves along these paths form reflecting particles in surfaces $S_1$, $S_2$, $S_3$ normal to the respective paths and each series of surfaces of these particles is a periodic structure corresponding to the half wave length of the radiation producing it. Upon development, the silver halide, if the emulsion is a silver emulsion, is decomposed as in photographic developing, leaving the silver in the periodic structures, each of which is composed of particles in surfaces at an angle to the surfaces of the other structures.

Figure 3:
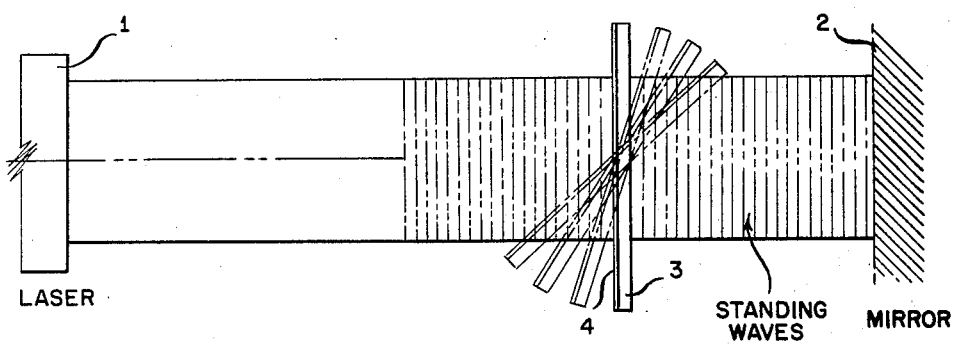
FIGURE 3 is an example of one specific embodiment of the invention, showing the apparatus used for recording information.

One specific embodiment of apparatus for practicing the invention, especially adapted for recording information as binary digits, is shown in FIGURE 3. The laser 1 emits coherent waves of a single wave length which are reflected by mirror 2 to produce interference between the waves and form standing waves. The recording medium used is a film 3 having a photosensitive emulsion 4 mounted adjacent the mirror, so that the waves pass through the film and form the standing waves in the emulsion. As shown in FIGURE 2, the waves from the light source are passed through the film in different directions, and for this purpose, the film is mounted to rotate in the path of the light waves. In each angular position of the film the light waves pass through in a different direction relative to the emulsion, and a periodic structure is formed in the emulsion along each path as illustrated diagrammataically in FIGURE 2. In the actual recording in a film, many such structures are formed in each region, the number depending on such factors as the thickness of the emulsion, the separation of the surfaces and the transparency of the emulsion.

Each surface in the periodic structure formed in each position of the film is defined by particles of metallic silver, these surfaces corresponding to the loci of peak energy of the radiation. Each periodic structure will act to reflect wave energy transmitted through the emulsion which is of the half wave length corresponding to the separation of the surfaces along the normal to the surfaces. By positioning the paths of the waves in different directions, it is possible to use the same source or the same wave length for recording in the same region. It is also possible to use different wave lengths of radiation at the different angles, and to use different wave lengths at the same angle, so the possibility of recording bits in different paths and different wave lengths in the same region or "cell" provides for packing much information in a single small region.

As used to record information as "bits" or binary form, a helium-neon gas laser produces a beam having a wave length of 6328 A. The emulsion was that of Eastman Kodak Type 649F. In each region of the film, the radiation formed periodic structures, each representing one bit of information in the one region.

While the best mode of recording information by "bits" in distinct regions in films is described, this method and apparatus are only illustrative of the broad principle illustrated diagrammatically in FIGURE 2. The radiation has been illustrated by use of a laser beam, because the coherent radiation is especially adapted to this form of recording, but other forms of radiation may be used, if the wave energy is applied to a sensitive medium in the form of interfering waves to produce peak energy levels and a periodic structure. Such structures may be arranged at angles to each other, as shown in FIGURE 2, and the waves of the same length may form the different structures. The significant advantage of the coherent wave radiation is that interference may be produced between two beams readily, and the beams are narrower than other forms of radiation.

This invention in its broadest aspect, requires a form of wave energy which produces interference and corresponding peaks of energy, and a medium which transmits the wave energy and which is modified in its transmission and reflective properties by the energy peaks of the wave energy. The invention can then be carried out by passing the interfering waves through the medium in different directions to form a series of surfaces defined by modification of the medium in each direction which constitutes a periodic structure and can be sensed or "read" by radiation of suitable wave length traversing the structure. In this way, radiation of the same wave length can be used to record in several different directions, while radiation of different wave lengths may also be used in each direction.

Monochromatic, coherent light such as produced by a laser is particularly effective for the recording of information in a photosensitive medium in accordance with this invention. For the recording of "bits" in distinct regions or "cells," the laser provides a narrow beam for a small region. In recording larger areas of information, as images or drawings, the laser coherent radiation provides a means to compress a large amount of information into a single structure. With this type of operation, as well as others, a mask may be positioned in front of the medium to screen off portions of the medium and prevent recording in any particular regions in any direction.

Figure 4:
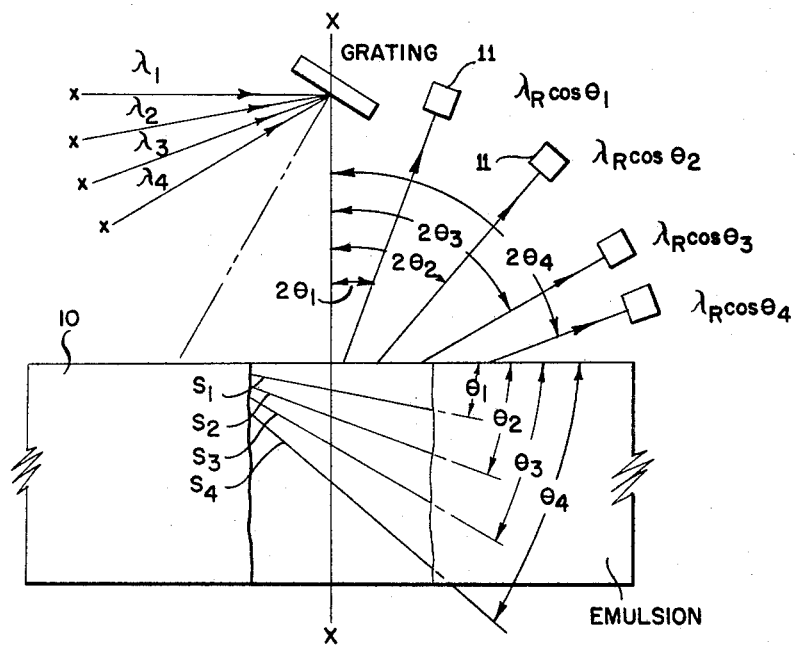
FIGURE 4 illustrates one system for reading information stored in the recording medium.

The information recorded in the medium is read by transmitting radiation of appropriate wave length through the recording medium, and sensing the transmitted or reflected wave energy as modified by the periodic structures of the medium. In FIGURE 4, the recording medium 10 is illustrated in which a series of periodic structures have been established as described above. Each series of surfaces in the region is represented in the diagrammatic showing by a single line, as $S_1$, $S_2$, $S_3$, $S_4$. If wave energy is transmitted across these several structures, only those wave lengths equal to twice the spacing of any one of the periodic structures will be reflected by reflecting elements in the surfaces of the structures to be emitted by the medium. Referring to FIGURES 1 and 2, a train of waves of wave length $\lambda$ at angle $\theta_1$ to line X—X would be in phase with the periodic structure of surfaces $S_1$, and would be reflected back along the same path. Thus, a source, such as a laser, of the same wave length or differing slightly to compensate for shrinkage, may be directed perpendicular to the surfaces of each periodic structure to reflect back the information recorded.

In the read operation illustrated in FIGURE 4, wave radiation is transmitted in a single path along line X—X through the recording region, and in order to sense any periodic structure representing information in this cell or region, the wave radiation must include wave lengths corresponding to those which will be reflected by the periodic structure. This radiation may be from a single source which includes the required wave lengths, or may be from several monochromatic light sources, as illustrated. In this apparatus, the beam must include the wave lengths $\lambda_1 = \lambda_R \cos \theta_1$, $\lambda_2 = \lambda_R \cos \theta_2$, $\lambda_3 = \lambda_R \cos \theta_3$, etc., where $\lambda_R$ = exposing wave length. The cosine factor comes in because of the condition for constructive interference for off normal incidence. The separate detectors 11 will sense the radiation in different directions.

Figure 5:
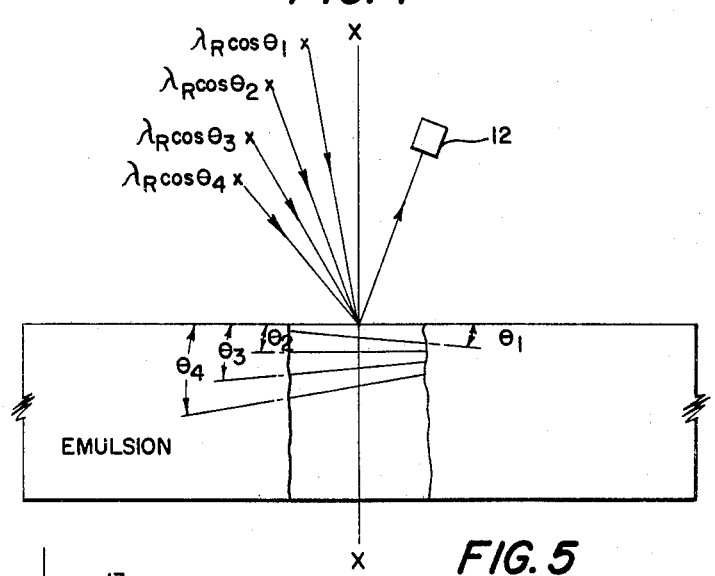
FIGURE 5 is another system for reading.
Figure 6:
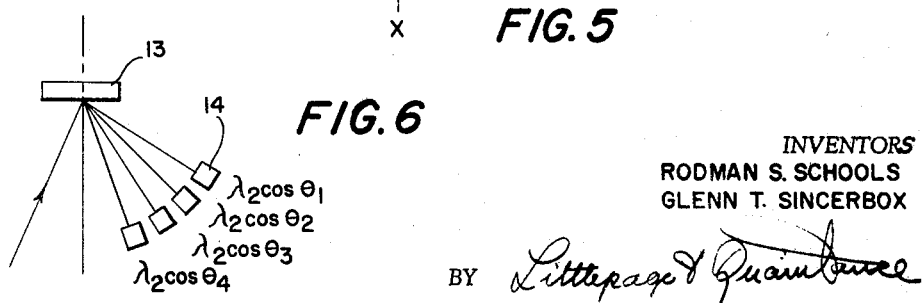
FIGURE 6 is a modification of a portion of the apparatus shown in FIGURE 5.

The apparatus in FIGURE 5 reads by radiations from different directions to the region of the emulsion, the wave lengths each being equal to the exposing wave length multiplied by the cosine of the angle of the surfaces S to the normal of the emulsion. In this arrangement, all the reflected radiations may be sensed by a detector 12, or the wave lengths may be separated by a grating 13 for sensing by different detectors 14, as shown in FIGURE 6. These detectors may include phototubes which receive the wave energy and deliver pulses to a storage register.

While the specific application of the principles of this invention to recording and reading of information in the form of "bits" or units in distinct regions has been described, these principles may be applied to the recording of information in other forms, such as images or graphic patterns, as has been described. Any represenation of information which can be recorded on a surface or by light may be represented by a periodic structure as herein described in a medium sensitive to wave energy. With this system, the use of interference phenomenon with coherent radiation may condense a maximum amount of information in an extremely small volume.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A record receiving member comprising a transparent film in which a layer of emulsion has light reflecting particles arranged in a plurality of series of parallel equally spaced surfaces to form periodic structures in said layer of emulsion, each of said periodic structures comprising a set of equally spaced surfaces extending throughout the thickness of said layer of emulsion and the surfaces of each structure being at an angle to the surfaces of certain of the other structures.

2. The method of recording information in a film having a layer of wave energy sensitive emulsion which may be developed to form reflective particles after being sensitized by wave energy, comprising transmitting a plurality of interfering coherent electromagnetic waves in each of a plurality of directions through said emulsion, said waves having a coherence length at least as great as the length of the path through said emulsion, the peak energy levels produced at the antinodes by the interference of said waves acting on said emulsion to sensitize said emulsion, the loci of said peak energy levels produced at said antinodes by said interference of said waves in each direction lying in equally spaced surfaces to form a periodic structure extending throughout the thickness of said emulsion with the surfaces of each structure at an angle to the surfaces of each of the other structures, and developing said film to produce reflective elements in each of said surfaces of said periodic structures so that each periodic structure reflects waves corresponding to said structure.

3. The method of recording and reading information in a film having a wave energy sensitive emulsion layer comprising transmitting interfering monochromatic coherent electromagnetic radiation in each of a plurality of directions through said medium, the coherence length of said radiation being greater than the length of its path through said emulsion layer, the peak energy levels produced by interference of said waves acting on said emulsion to sensitize said emulsion, the loci of said peak energy levels produced by interference of said radiation in each direction lying in equally spaced surfaces to form a periodic structure with the surfaces of each structure at an angle to the surfaces of each of the other structures, and transmitting radiation through said medium at an angle to said surfaces to sense said periodic structures by reflection of radiation of a corresponding wave length.

4. The method of recording information in a region in a film having a photosensitive emulsion which may be sensitized by electromagnetic radiation above the threshold level and which forms reflective particles when developed, comprising passing monochromatic coherent electromagnetic radiation through said region of said film at different angles to said film, reflecting said radiation at each angle back through said film in the same path as the incident radiation to form standing waves in said emulsion, the coherence length of said radiation being greater than the length of its path through said emulsion, the antinodes of said standing waves producing peak energy levels to sensitize said emulsion in parallel surfaces normal to each path of radiation to form periodic structures with their surfaces at angles to each other, and developing said emulsion to form periodic reflective structures to reflect radiation of corresponding wave lengths.

5. A system for recording a plurality of bits of information comprising a film having a photosensitive silver halide emulsion, means for transmitting interfering waves of monochromatic coherent electromagnetic radiation through said emulsion in a region of said film in each of a plurality of different directions, the coherence length of said radiation being greater than the length of the path of said radiation through said emulsion, the antinodes of the interfering waves in each direction producing peak energy levels to form a periodic structure of parallel surfaces of sensitized emulsion throughout the thickness of said emulsion with the parallel surfaces of each structure at an angle to the surfaces of each of the other structures, so that when said emulsion is developed, silver particles are formed on said surfaces and each periodic structure reflects radiation of corresponding wave length.

6. A system for recording a plurality of bits of information, comprising a film having a photosensitive emulsion which may be sensitized by electromagnetic radiation and developed to form metallic reflective particles in a sensitized region, means for transmitting monochromatic coherent electromagnetic radiation through said photosensitive emulsion in a region of said film at different angles to said film, means to reflect the radiation at each angle back along the same path to form standing waves in said emulsion, the coherence length of said radiation being greater than the length of the path of said radiation through said emulsion, the antinodes of said standing waves at each angle producing peak energy levels to sensitize said emulsion and produce a periodic structure of sensitized parallel surfaces throughout said emulsion in said region, said parallel surfaces forming reflective surfaces of said metallic particles upon development, the surfaces of each of said periodic structures being at an angle to the surfaces of the other structures.

7. A system as claimed in claim 6, in which the means to reflect the radiation is spaced from the surface of said emulsion.

8. A system for recording information comprising film having a wave energy sensitive emulsion which when sensitized by wave energy above a threshold level will form reflective particles upon development, means generating coherent wave energy of a single wave length and transmitting said wave energy in interfering waves in different directions through a recording region of said emulsion to produce interference between certain of said interfering waves in each direction to create peak energy levels above said threshold level at loci along each of said directions to sensitize said emulsion at said loci, the modification of the emulsion at the loci formed along each direction forming a periodic structure extending through the thickness of said emulsion corresponding to the antinodes of the interfering waves, each of said periodic structures comprising said reflective particles on development to reflect radiation of a corresponding wave length.

9. The system claimed in claim 8, with means to transmit light through said emulsion with said periodic structures in the same directions as the original interfering radiation, and means to sense the light reflected by each of said periodic structures.

10. A system for recording information comprising a film having a photosensitive emulsion, a source of coherent light of a single wave length which transmits light through said emulsion, a reflecting surface which reflects light from source back toward the source through said emulsion to establish standing waves in said emulsion, said standing waves forming equally spaced peak energy levels throughout the path of said light in said emulsion to sensitize said emulsion to produce reflective particles upon development of said emulsion, so that the loci of said peak energy levels will form a periodic structure in said emulsion, and means to shift the relative angular positions of said light elements and emulsion to change the direction of passage of said radiation through said emulsion, so that standing waves may be established in a plurality of directions through said emulsion and form a periodic structure in each direction.

11. A system as defined in claim 10, in which the source of coherent light is a laser.

12. A system as claimed in claim 10, and means to sense the reflection of coherent, monochromatic light of the same wave length as the recording radiation in each direction, in any position of said film.

References Cited

UNITED STATES PATENTS

| | | | |
|---|---|---|---|
| 2,712,572 | 7/1955 | Roberts | 179—100.2 |
| 3,314,052 | 4/1967 | Lohmann | 340—173 |
| 3,408,143 | 10/1968 | Mueller | 350—3.5 X |

OTHER REFERENCES

H. Fleischer et al., "An Optically Accessed Memory Using the Lippmann Process for Information Storage," Optical and Electro-Optical Information Processing, M.I.T., Cambidge, Mass., 1965, pp. 1–30.

A. Friesem, "Holograms on Thick Emulsions," Applied Physics Letters 7 (1965), pp. 102–103.

Denisyuk, Y. N., "On the Reproduction of the Optical Properties of an Object by the Wave Field of its Scattered Radiation," Optics and Spectroscopy, v. 15, n. 4, October 1963, pp. 279–284.

Leith, E. N. and Upatnieks, J., "Wavefront Reconstruction with Diffused Illumination and Three-Dimensional Objects," J. Optical Society of America, v. 54, n. 11, November 1964, pp. 1295–1301.

Van Heerden, P. J., "Theory of Optical Information Storage in Solids," Applied Optics, v. 2, n. 4, April 1963, pp. 393–400.

BERNARD KONICK, Primary Examiner

J. F. BREIMAYER, Assistant Examiner

U.S. Cl. X.R.

96—2; 346—108, 135

UNITED STATES PATENT OFFICE
CERTIFICATE OF CORRECTION

Patent No. 3,503,050                            March 24, 1970

Rodman S. Schools et al.

It is certified that error appears in the above identified patent and that said Letters Patent are hereby corrected as shown below:

Column 5, line 28, "represenation" should read -- representation --. Column 7, line 18, before "source", first occurrence, insert -- said --.

Signed and sealed this 21st day of July 1970.

(SEAL)
Attest:

Edward M. Fletcher, Jr.                      WILLIAM E. SCHUYLER, JR.
Attesting Officer                                Commissioner of Patents